United States Patent [19]

Renfrew

[11] Patent Number: 4,673,199
[45] Date of Patent: Jun. 16, 1987

[54] HOSE COUPLING

[75] Inventor: Bruce Renfrew, Leicester, England

[73] Assignee: Hozelock-ASL Limited, Aylesbury, England

[21] Appl. No.: 870,725

[22] Filed: Jun. 4, 1986

[30] Foreign Application Priority Data

Jun. 11, 1985 [GB] United Kingdom ................. 8514678

[51] Int. Cl.⁴ ............................................. F16L 37/12
[52] U.S. Cl. ..................................... 285/316; 285/319
[58] Field of Search ......................... 285/319, 316, 315

[56] References Cited

U.S. PATENT DOCUMENTS

| | | | |
|---|---|---|---|
| 2,327,611 | 8/1943 | Scheiwer | 285/316 |
| 2,344,740 | 3/1944 | Shaff | 285/316 X |
| 4,216,982 | 8/1980 | Chow | 285/315 |
| 4,219,222 | 8/1980 | Brusadin | 285/319 X |

FOREIGN PATENT DOCUMENTS 2425004 12/1974 Fed. Rep. of Germany ...... 285/315
2036906 7/1980 United Kingdom ................. 285/316

*Primary Examiner*—Thomas F. Callaghan
*Attorney, Agent, or Firm*—Lee, Smith & Zickert

[57] ABSTRACT

A hose coupling has a tubular body (10) one end of which is intended to be attached to the end of a hosepipe (14), and the other end of which has a bore (12) to receive the spigot (20) of a co-operating coupling (22) which is retained in the bore with a snap action. Three locking members (38) project into the bore (12) to hold the spigot (20) therein, and a locking sleeve (24) can be moved axially of the body (10) to force the locking members (38) to a release position, enabling the spigot (20) to be withdrawn from the bore to separate the couplings. The locking members (38) are interconnected by a ring (26) attached to the end of the body (10), and during assembly of the coupling the body (10) and the ring (26) interengage with a snap action to retain the ring (26) in fixed relationship to the body (10) and to hold the sleeve (24) captive on the body (10).

19 Claims, 5 Drawing Figures

HOSE COUPLING

FIELD OF THE INVENTION

This invention relates to hose couplings.

SUMMARY OF THE INVENTION

According to the invention a hose coupling comprises a tubular body with a central bore having one end for communication with a hose and the other end for the reception of a spigot of a co-operating coupling, an outer sleeve surrounding the body and capable of axial sliding movement with respect to the body, and a plurality of locking members which extend through openings in the body to project into said other end of the bore, the locking members being interconnected by a ring which is located axially and rotationally with respect to the body, each locking member being capable of movement between a normal locking position in which the locking member projects into the bore to retain the spigot therein and a release position in which the locking member is urged to a retracted position to enable the spigot to be withdrawn from the bore, the locking members being forced to their release positions by axial movement of the sleeve towards said other end of the bore.

Preferably, the outer sleeve is biased towards a normal position corresponding to the normal locking position of the locking members, the outer sleeve being moved against this bias to a release position corresponding to the release position of the locking members. The bias may be provided by a spring, e.g. a helical compression spring acting between the body and sleeve, but in an alternative arrangement the inherent tendency of the locking members to assume their locking positions may be utilised to provide the force which returns the sleeve to its locking position.

The sleeve preferably carries a plurality of formations equal in number to the number of locking members, each said formation engaging a corresponding locking member to urge the latter to its release position when the outer sleeve is moved to its release position. The locking members are preferably integrally formed with the ring from a synthetic plastics material, each locking member projecting from the ring and being capable of flexing with respect to the ring as a result of the inherent flexibility of the plastics material.

Each said formation may comprise a pair of spaced lugs which project inwardly of the sleeve and which are shaped so that when the sleeve is moved towards its release position the lugs engage the locking members and swing the latter radially outwardly to the release position of the locking members.

Preferably, the body and the ring interengage with a snap action, to retain the ring in fixed relationship to the body, and to retain the sleeve in position on the body, whilst allowing the sleeve to move axially between its locking position and its release position. In the preferred embodiment to be described, said openings are constituted by a plurality of slots, with the material of the body between the slots forming tongues, the extremities of which engage the ring to retain the ring, the body and the sleeve in their assembled condition.

There may be three locking members, equi-angularly spaced around the bore, in order to provide firm retention for the spigot within the bore. The spigot can be part of a "male" hose coupling or be part of special hose attachment or fitting, such as a spray nozzle or washing brush.

The locking members are preferably shaped such that, with the spigot retained in the bore by the locking members, an attempt to withdraw the spigot from the bore tends to urge the locking members to move radially inwardly and lock against the spigot even more firmly.

A hose coupling according to the invention will now be described by way of example, with reference to the accompanying drawings in which:

FIG. 1 is a sectional view of a hose coupling forming the preferred embodiment of the invention, the coupling being shown attached to a hose end, FIG. 2 shows the coupling of FIG. 1 as the spigot of a cooperating hose coupling is pushed into postion, FIG. 3 shows the two couplings in their engaged condition, FIG. 4 illustrates how the spigot may be withdrawn from the coupling of FIG. 1, and FIG. 5 is a fragmentary view on an enlarged scale illustrating how locking members of the hose coupling of FIG. 1 are moved to their release position.

DETAILED DESCRIPTION OF THE DRAWINGS

Figure 1:
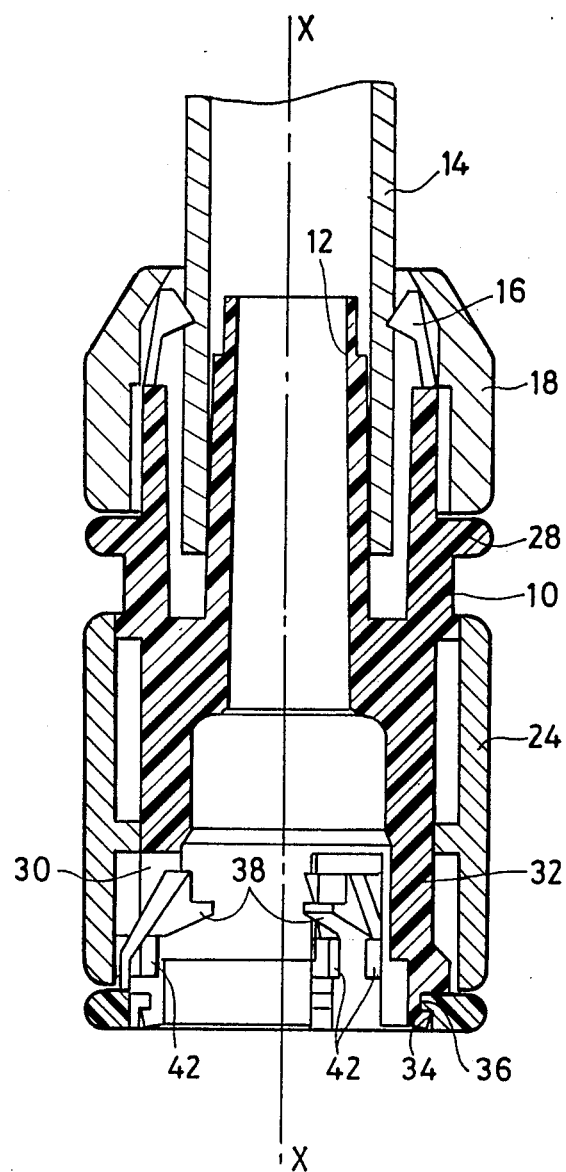

The preferred embodiment of hose coupling comprises a body 10 moulded from a synthetic plastics material. The body 10 has a through bore 12 one end of which is shown in FIG. 1 communicating with a hose pipe 14. The end of the hose pipe 14 is detachably connected to the body 10 by means of a plurality of fingers 16 clamped against the outside of the hose pipe 14 by means of a tightening ring 18.

At its other end, the bore 12 is enlarged to receive the spigot 20 (FIGS. 2 to 4) of a co-operating male hose coupling 22.

Figure 2:
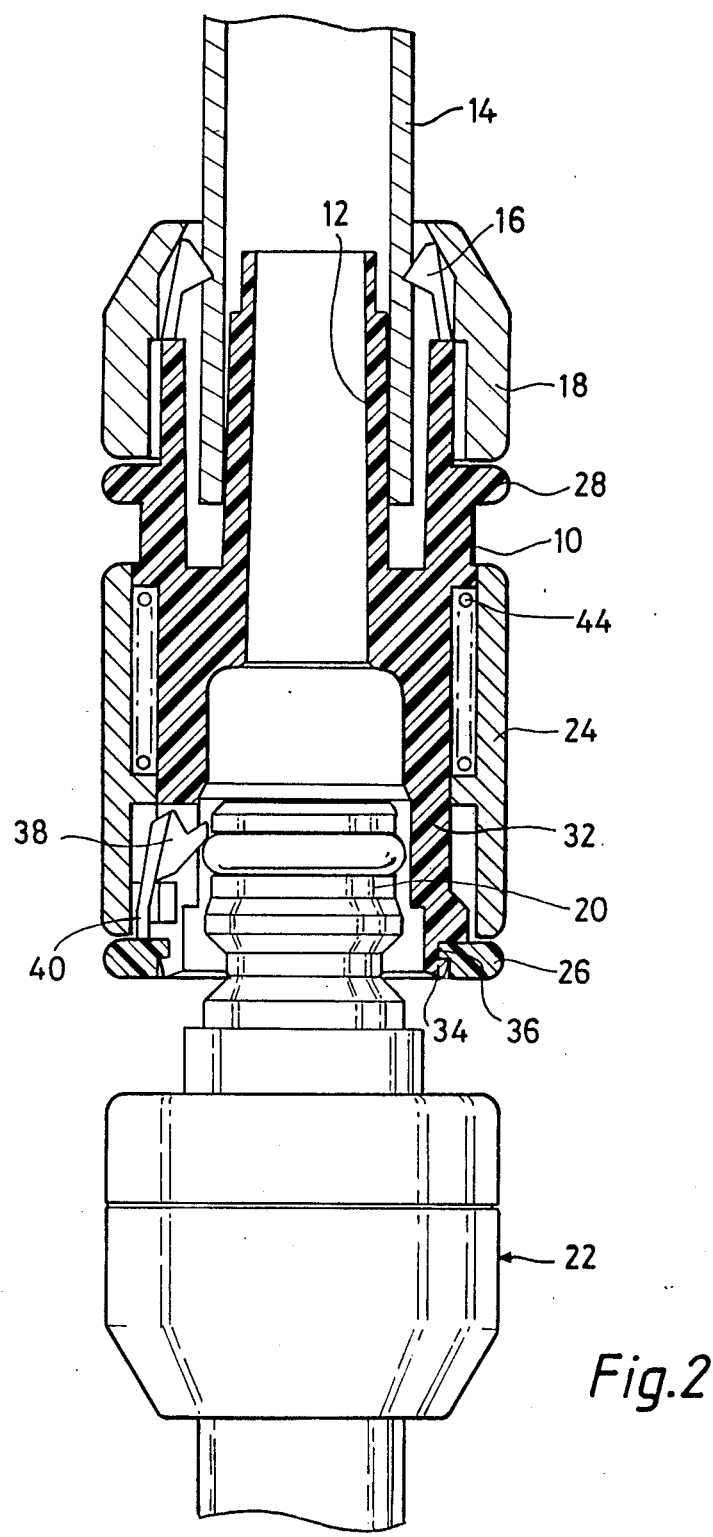
Figure 3:
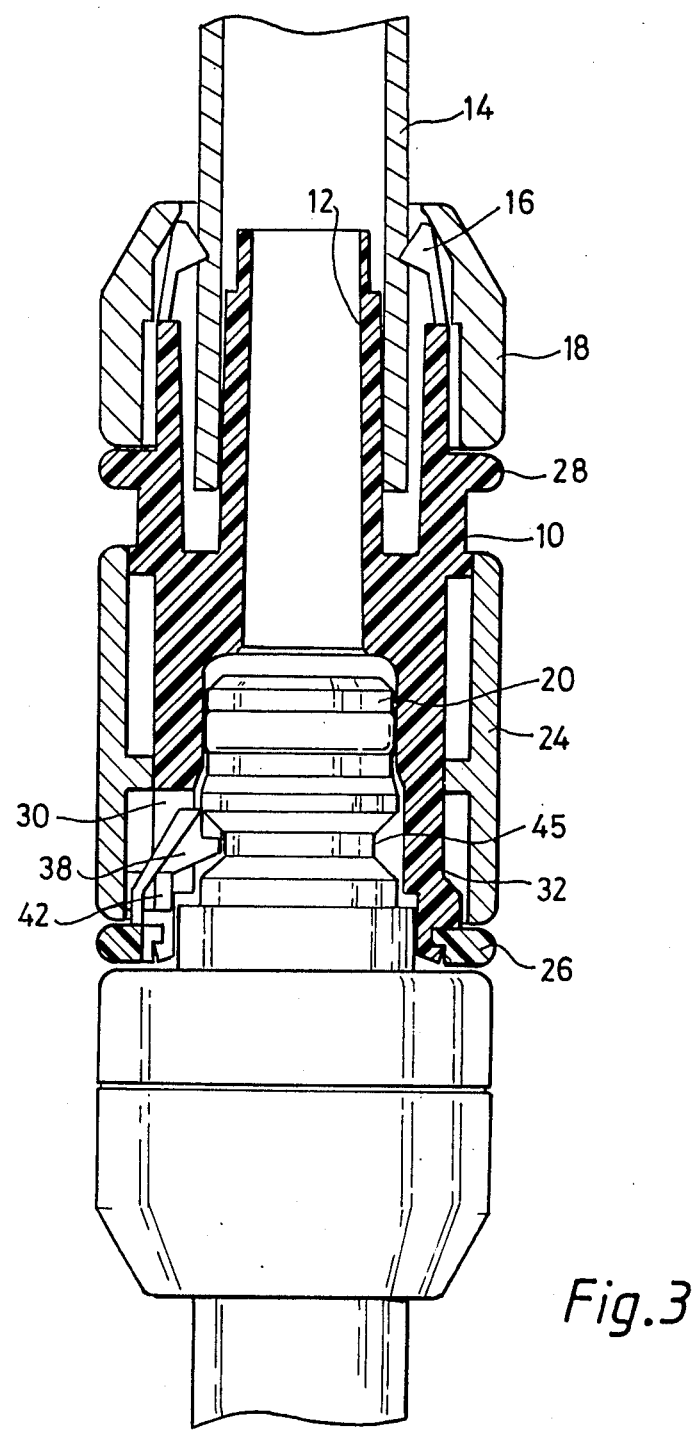
Figure 4:
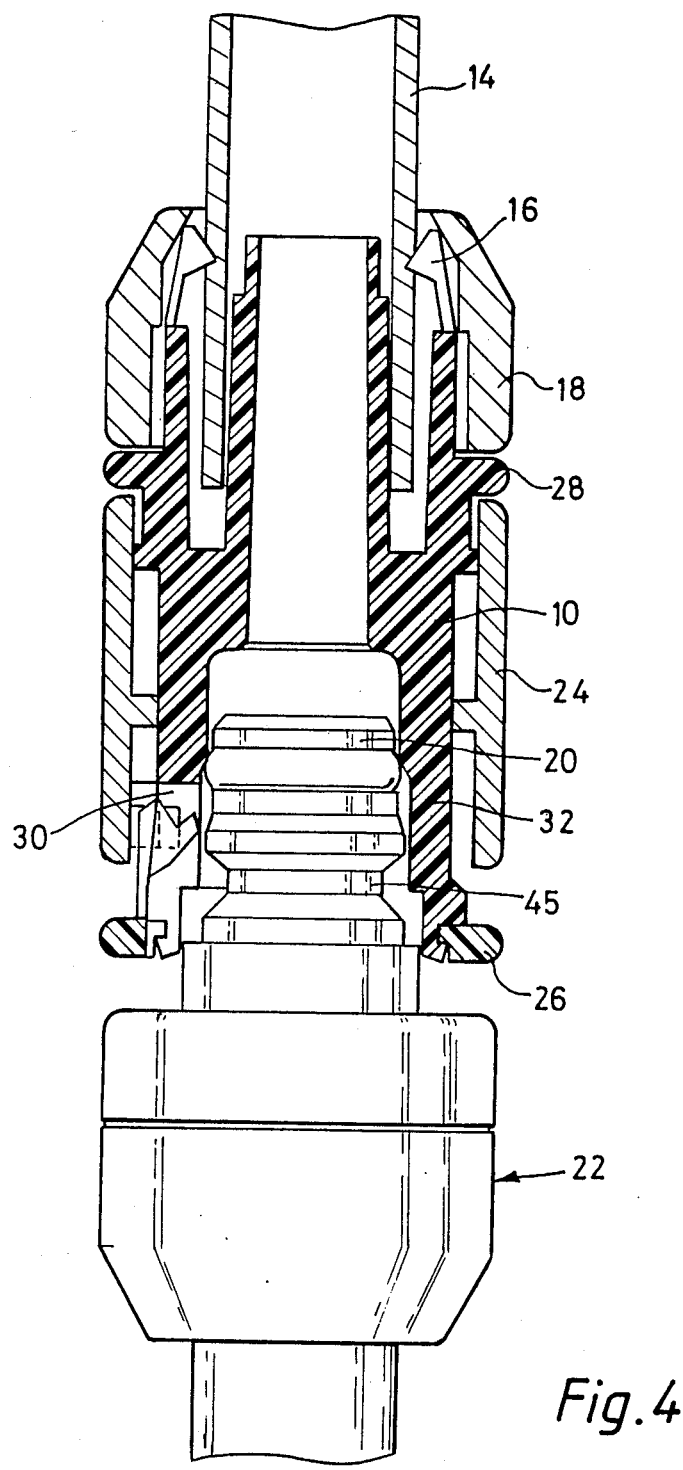

An outer sleeve 24 surrounds the body 10 and is arranged to be axially movable between its normal locking position shown in FIGS. 1 to 3 and a release position shown in FIG. 4. In its normal locking position the lower end of the sleeve 24 as viewed in the drawings engages a ring 26 which is fixed on the body 10. In its release position, the upper end of the sleeve 24 as shown in the drawings engages an annular ring 28 on the body 10, as illustrated in FIG. 4.

The lower end of the body 10 has three slots 30 which are equi-angularly spaced around the central axis X—X of the coupling and which run out to the lower end of the body 10, leaving between the slots 30, three downwardly projecting tongues 32. The extremity of each tongue 32 is shaped to form a toe 34 which engages with a snap action behind an annular ledge 36 formed on the ring 26. By this means the body 10 is rigidly attached to the ring 26, with the sleeve 24 located on the body 10 and capable of axial sliding movement between end limits defined by the ring 26 and by the ring 28.

The spigot 20 is retained in the body 10 by means of three locking members 38 integrally formed with the ring 26. Each locking member 38 is connected to the ring 26 by a web 40 which is capable of flexing movement, and therefore acts in the manner of a hinge, by virtue of the inherent flexibility of the material from which the ring 26 and the locking members 38 are moulded. Each locking member 38 projects through a corresponding one of the slots 30 in the body 10 in order to engage the spigot 20 and lock the latter in position, as illustrated in FIG. 3.

Each web 40 extends between a corresponding pair of lugs 42 (best shown in FIG. 1) which project radially inwardly from, and are integrally moulded with, the sleeve 24. In their normal free condition, the locking members 38 project into the bore of the member 10, and the upper edges of the lugs 42 engage the undersides of the locking members 38. This interengagement biases the sleeve 24 towards the normal locking position shown in FIGS. 1 to 3. Alternatively, or in addition, this biasing effect may be provided by a helical compression spring acting between the body 10 and the sleeve 24, as illustrated by way of example at 44 in FIG. 2.

FIG. 2 shows how the spigot 20 is simply pushed into the body 10 in order to join the male coupling 22 to the female coupling forming the preferred embodiment of the invention. During insertion of the spigot 20 the locking members 38 are pushed radially outwardly with attendant flexing of the webs 40, until the resilience of the webs 40 causes the locking members 38 to snap into engagement with the groove 45 in the spigot 20, as illustrated in FIG. 3. It is not necessary to move the sleeve 24 to achive interconnection.

To effect release of the spigot 20 from the body 10, the sleeve 24 is moved to its release position shown in FIG. 4. This axial movement of the sleeve 24 causes the upper surfaces of the lugs 42 to engage and swing the locking members 38 radially outwardly in order to release the locking members 38 from the groove 45. The spigot 20 may then simply be withdrawn from the body 10. When the sleeve 24 is released it moves back to its normal locking position as the locking members 38 swing back to their normal locking positions in which they project into the bore in the body 10. This return of the sleeve 24 to its locking position, and the return of the locking members 38 to their locking positions, occurs as a result of the natural tendency of the webs 40 to regain their original positions.

Figure 5:
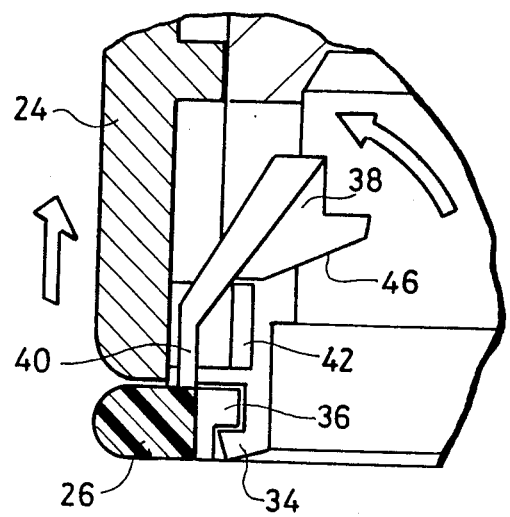

It will be appreciated that the under surface 46 (FIG. 5) of each locking member 38 is shaped so that when the sleeve 24 is moved to its release position the cooperating upper surfaces of the lugs 42 engage and displace the locking inserts 38 with a suitable camming action which deflects the locking members 38 and moves them to their release positions, as indicated by the arrows in FIG. 5. The locking members 38 are also shaped such that, with the spigot 20 engaged in the body 10, any tendency to withdraw the spigot 20 from the body 10 causes the locking members 38 to move radially inwardly and thereby increase their locking action.

The body 10 sleeve 24 and ring 26 are made so that the coupling can be assembled with a simple snap action. This is done by mounting the ring 26 on a mandrel which holds the locking members in a radially outwardly deflected condition and then sliding the sleeve 24 into position so that the lugs 42 embrace the webs 40. The body 10 is then pushed downwardly into the assembly of the sleeve 24 and ring 26 until the toes 34 engage the ledges 36 with a snap action which then holds the components 10, 24 and 26 in position.

I claim:

1. A hose coupling comprising a tubular body with a central bore having one end for communication with a hose and the other end for the reception of a spigot of a cooperating coupling, an outer sleeve surrounding the body and capable of axial sliding movement with respect to the body, and a plurality of locking members which extend through openings in the body to project into said other end of the bore, the locking members being interconnected by a ring which is located axially and rotationally with respect to the body, the locking members being integrally formed with the ring from a synthetic plastic material, each locking member projecting from the ring and being capable of flexing with respect to the ring as a result of the inherent flexibility of the plastic material, each locking member being capable of movement between a normal locking position in which the locking member projects into the bore to retain the spigot therein and a release position in which the locking member is urged to a retracted position to enable the spigot to be withdrawn from the bore, the locking members being forced to their release positions by axial movement of the sleeve towards said one end of the bore, the sleeve carrying a plurality of formations equal in number to the number of locking members, each said formation engaging a corresponding locking member to urge the latter to its release position when the sleeve is moved to its release position.

2. A hose coupling according to claim 1, wherein the ring is attached to the end of the body corresponding to the other end of the bore.

3. A hose coupling according to claim 1, wherein the outer sleeve is biased towards a normal position corresponding to the normal locking position of the locking members, the outer sleeve being moved against this bias to a release position corresponding to the release position of the locking members.

4. A hose coupling according to claim 3, wherein said bias is provided by a spring acting between the body and sleeve.

5. A hose coupling according to claim 3, wherein the locking members include an inherent tendency to assume their locking positions said tendency being utilised to provide the force which returns the sleeve to its locking position.

6. A hose coupling according to claim 1, wherein each said formation comprises a pair of spaced lugs which project inwardly of the sleeve and which are shaped so that when the sleeve is moved towards its release position the lugs engage the locking members and swing the latter radially outwardly to the release position of the locking members.

7. A hose coupling according to claim 1, wherein the body and the ring interengage with a snap action, to retain the ring in fixed relationship to the body, and to retain the sleeve in position on the body, whilst allowing the sleeve to move axially between its locking position and its release position.

8. A hose coupling according to claim 7, wherein said openings are constituted by a plurality of slots, with the material of the body between the slots forming tongues, the extremities of which engage the ring to retain the ring, the body and the sleeve in their assembled condition.

9. A hose coupling according to claim 1, wherein there are three locking members, equi-angularly spaced around the bore, in order to provide firm retention for the spigot within the bore.

10. A hose coupling according to claim 1, wherein the locking members are shaped such that, with the spigot retained in the bore by the locking members, an attempt to withdraw the spigot from the bore tends to urge the locking members to move radially inwardly and lock against the spigot even more firmly.

11. A hose coupling comprising a tubular body with a central bore having one end for communication with a hose and the other end for the reception of a spigot of a cooperating coupling, an outer sleeve surrounding the body and capable of axial sliding movememnt with resepect to the body, and a plurality of locking members which extend through openings in the body to project into said other end of the bore, the locking members being interconnected by a ring which is located axially and rotationally with respect to the body, each locking member being capable of movement between a normal locking position in which the locking member projects into the bore to retain the spigot therein and a release position in which the locking member is urged to a retracted position to enable the spigot to be withdrawn from the bore, the locking members being forced to their release positions by axial movement of the sleeve towards said one end of the bore, the sleeve carrying a plurality of formations equal in number to the number of locking members, each said formation engaging a corresponding locking member to urge the latter to its release position when the outer sleeve is moved to its release position, each said formation comprising a pair of spaced lugs which project inwardly of the sleeve and which are shaped so that when the sleeve is moved towards its release position the lugs engage the locking members and swing the latter radially outwardly to the release position of the locking members.

12. A hose coupling according to claim 11, wherein the ring is attached to the end of the body corresponding to the other end of the bore.

13. A hose coupling according to claim 11, wherein the outer sleeve is biased towards a normal position corresponding to the normal locking position of the locking members, the outer sleever being moved against this bias to a release position corresponding to the release position of the locking members.

14. A hose coupling according to claim 13, wherein said bias is provided by a spring acting between the body and sleeve.

15. A hose coupling according to claim 13, wherein the locking members include an inherent tendency to assume their locking positions, said tendency being utilised to provide the force which returns the sleeve to its locking position.

16. A hose coupling according to claim 11, wherein the body and the ring interengage with a snap action, to retain the ring in fixed relationship to the body, and to retain the sleeve in position on the body, whilst allowing the sleeve to move axially between its locking position and its release position.

17. A hose coupling according to claim 16, wherein said openings are constituted by a plurality of slots, with the material of the body between the slots forming tongues, the extremities of which engage the ring to retain the ring, the body and the sleeve in their assembled condition.

18. A hose coupling according to claim 11, wherein there are three locking members, equi-angularly spaced around the bore, in order to provide firm retention for the spigot within the bore.

19. A hose coupling according to claim 11, wherein the locking members are shaped such that, with the spigot retained in the bore by the locking members, an attempt to withdraw the spigot from the bore tends to urge the locking members to move radially inwardly and lock against the spigot even more firmly.

* * * * *